July 1, 1952     J. A. SMITH     2,601,857
FOLDABLE SMOKING PIPE
Filed Dec. 13, 1946
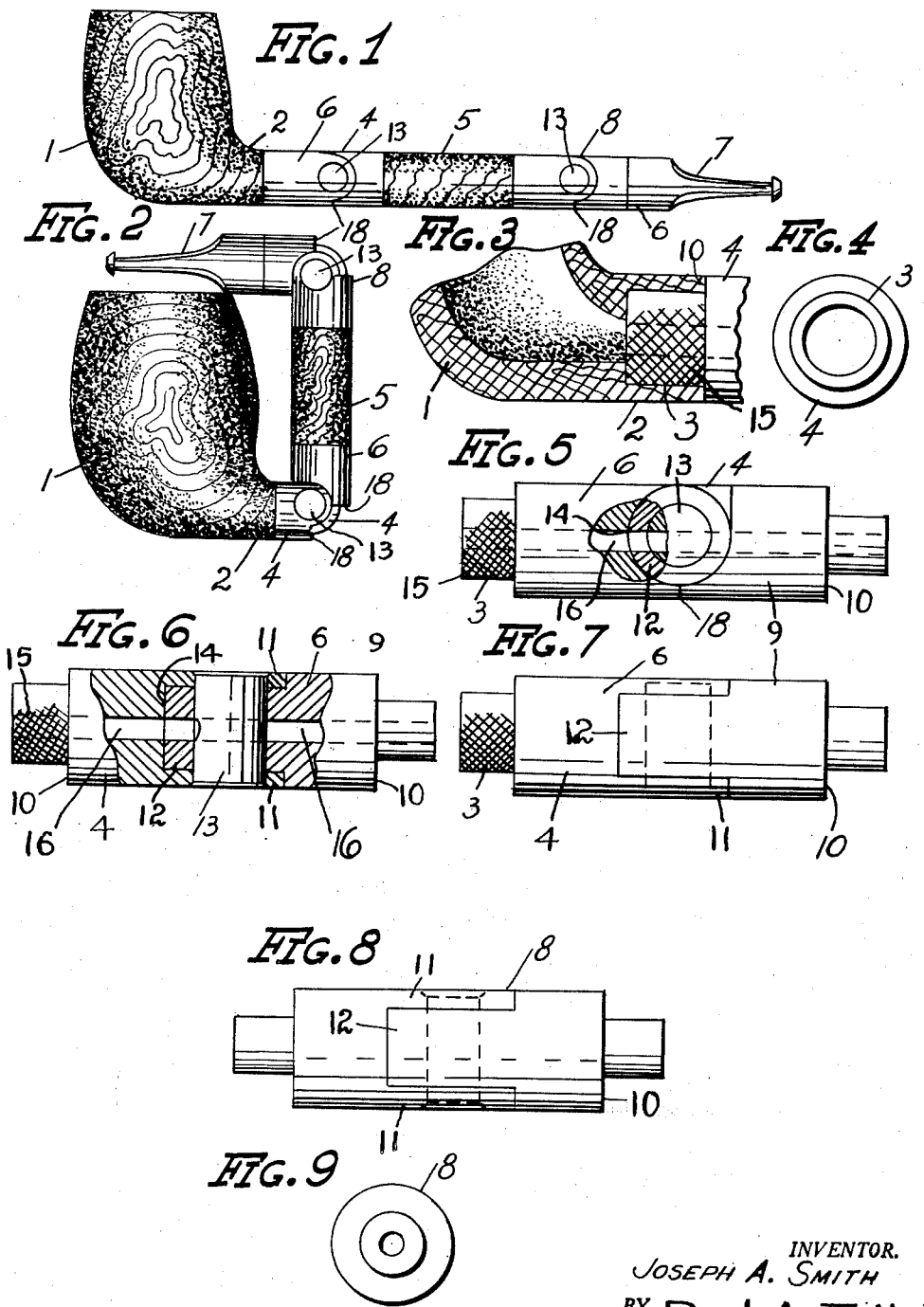
INVENTOR.
JOSEPH A. SMITH
BY Paul A. Talbot
ATTORNEY Patented July 1, 1952

2,601,857

UNITED STATES PATENT OFFICE 2,601,857

FOLDABLE SMOKING PIPE

Joseph A. Smith, New York, N. Y.

Application December 13, 1946, Serial No. 715,897

12 Claims. (Cl. 131—192)

My invention relates to a stem for smokers' pipes which is jointed for bending. Among the purposes and objects are to provide a pipe stem which may be bent and separated at the joints or cleaned while straight.

Another object is to provide a jointed pipe stem which is tight against leakage.

Still another object is to provide a pipe stem which may be tightened to compensate for wear and rough usage.

An object is to provide a pipe in which the stem may be bent at the joints to fold up along the sides and over the top of the tobacco bowl when not in use so that the pipe is compact while being carried in the pocket.

An object is to provide a pipe joint which may be easily taken part.

I accomplish these and other objects by the construction herein described and shown in the drawings which form a part of this, my disclosure.

In the drawings:

Fig. 1 is a side elevational view of my pipe and stem.

Fig. 2 is a side elevational view showing the pipe stem bent at the joints as when carried.

Fig. 3 is a fragmentary detail showing the securement of the stem to the bowl.

Fig. 4 is an end elevational view of the securement part of the joint at the bowl end.

Fig. 5 is a side elevational view of the securement joint.

Fig. 6 is a top plan and partial section of the securement joint.

Fig. 7 is a top plan view of the securement joint.

Fig. 8 is a top plan view of the tip connecting joint.

Fig. 9 is an end elevation of the tip connecting joint.

Similar reference characters refer to similar parts throughout the several views of the drawing and in the specifications which follow the general description.

I am aware that joints for folding up the pipe stems of tobacco pipes is not new but such joints are leaky and easily damaged by rough or continuous usage. Such stems are also not capable of being cleaned with an ordinary pipe stem cleaner without taking the joint apart and such joints are difficult to put together or separate without tools, making the frequent cleaning required difficult.

I overcome the above mentioned disadvantages as well as others by my improved pipe stem joint which has but two pressure tight seats for each joint and a straight through hole which may be frequently cleaned with a pipe stem cleaner in the usual way.

The joint also has a through pin which makes it possible to apply high pressure to the stem without leakage or separating the seats of the joint such as where a single headed pin on which the joint swings, is used.

My pipe stem joint may be briefly described as a knuckle joint in which the transversely bored pin serves as a cock as well as to permit the end joint to be forced tightly against its seat.

In the specifications which bear reference to the drawings, I have described the construction of a preferred embodiment in precise detail so that one skilled in the art to which this invention pertains may more readily understood it. I have not attempted to describe all possible modifications and, after a study of the construction herein described, modifications, which may be made without departing from the principles of my invention, may suggest themselves.

The preciseness of the details in the following specifications and the preciseness of the drawings are not intended to limit the scope of my invention which is set forth in the appended claims.

Referring to the drawings, I have shown a typical pipe bowl 1 having a stem boss 2 into which one of the connecting end bosses 3 of the stem joint 4 is forced. The stem boss 2 is so sized and positioned that the end boss which connects the stem boss and joint to the bowl and which is attached to center member 5 of the pipe stem 6, causes the member to be against or closely adjacent the bowl when the stem is bent or folded to its carrying position.

The bit or tip 7 of the pipe stem is connected to the member by the tip joint 8, thus by bending each of the two joints at about 90 degrees, the center member is folded alongside the bowl and the tip over it in readiness for carrying or for storing the pipe in a minimum space.

Each joint is provided with connecting bosses at each end which project from and beyond the body 9 which is preferably larger in diameter than the end boss, thereby to provide a shoulder 10 which abuts against the part which is connected. One body is provided with ears 11 or is bifurcated to receive the center seat member 12 between the ears. The ears and seat member, when secured together by the cock pin 13, comprise a knuckle joint of great strength and when the cock pin also is accurately fitted like the plug of a plug cock may carry very high pressure without leakage even when the joint is stressed in sealing the end, the end seats 14 between the center member and the abutting conforming seat in the bottom of the bifurcated body at the base of the ears. To this end, the cock pins 13 are fixed to portions 12 by a drive fit in the openings therein, to secure the cock pins to the male portions of the knuckle joints and whereby said cock pins are journaled in the female portions of the knuckle joints. With this construction when the pipe is bent to the position shown in Fig. 2 of the drawing, the through opening in the center piece 5 is open at the lower knuckle joint and the through opening in the tip 7 is open at the upper knuckle joint, so as to facilitate cleaning of the center piece and tip, and also to permit air to circulate therein when the pipe is not in use.

The connecting end bosses of the two joints may be identical, making it possible thereby to use a joint of one design for the two joints or the end bosses may vary and be provided with a knurled or threaded surface 15 to insure against accidental removal when forced into the softer material of the bowl, center member or tip.

When the joints are positioned so that the several parts connected thereby are in a straight line as shown in Fig. 1 of the drawings, the duct or hole 16 which passes through the tip, joints, center member and into the bowl, may be in line longitudinally permitting a pipe stem cleaner to pass through from tip to bowl, in the usual manner in cleaning pipe stems.

The cock pin may be threaded 17 or secured against accidental removal in other ways, such as by a keeper or riveting or upsetting the ends as is common in securing pins in their holes or bores.

Having thus described a preferred construction embodying the principles underlying my invention, what I claim as new and desire to secure by Letters Patent is set forth in the claims to follow.

I claim:

1. In a smoking pipe, a bowl, a stem including a stem joint, body means having a pair of swingingly mounted parts formed with a duct through each part, and a cock pin formed with a diametric duct communicating with the duct in each part, one of said parts having ears and a seat between the bases of said ears, and another of said parts having a center member with a seat conforming to said first mentioned seat to provide a pressure tight seal around said duct, said ducts in smoking position being in coaxial alignment with each other and forming a continuously straight passageway.

2. In a smoking pipe, a bowl, a stem including a stem joint, body means having a pair of swingingly mounted parts formed with a duct through each part, and a cock pin formed with a diametric duct communicating with the duct in each part, one of said parts having ears and a seat between the bases of said ears, and another of said parts having a center member with a seat conforming to said first mentioned seat to provide a pressure tight seal around said duct, said ducts in smoking position being in coaxial alignment with each other and forming a continuously straight passageway, said cock pin being fixed to said center member and journaled in said ears, and restraining said seal from leaking at high pressure.

3. A smoking pipe comprising a bowl formed with a stem extension, a center piece pivoted to the stem extension, and a tip pivoted to the center piece, said center piece being swingable upwardly relative to said stem extension to a position parallel to the bowl, and said tip being swingable to a position at right angles to the center piece and overlying the bowl, the pivotal connection between the center piece and the stem extension including means to prevent rotation of the center piece below horizontal position when said stem extension is in horizontal position, and the pivotal connection between the tip and the center piece including means to prevent rotation of the tip below horizontal position when said center piece is in horizontal position, said stem extension, center piece and tip, as well as both pivotal connections, being provided with a continuous straight, coaxial passage of uniform cross section throughout communicating with the bowl when said pipe is in smoking position.

4. A smoking pipe comprising a bowl formed with a stem extension part, and a stem member part, said stem extension part being formed with a through opening communicating with the interior of said bowl, said stem member part being formed with a longitudinal through opening, said stem extension part and stem member part being provided with interengaging apertured ears, a pin passing through the apertures in said ears for pivotally connecting the stem member part to the stem extension part, said pin being formed with a single, transverse, straight, diametric opening establishing communication between the through opening in the stem extension part and the through opening in the stem member part, all of said openings being in tandem coaxial alignment providing a uniform continuously straight passageway when the pipe is in smoking position so that a pipe cleaner can be easily passed through said passageway for cleaning the same.

5. A smoking pipe comprising a bowl formed with a stem extension, a center piece pivoted to the stem extension, and a tip pivoted to the center piece, said center piece being swingable upwardly relative to said stem extension to a position parallel to the bowl, and said tip being swingable to a position at right angles to the center piece and overlying the bowl, said stem extension being formed with a through opening communicating with interior of the bowl, said center piece being formed with longitudinal through opening and said tip being formed with longitudinal through opening, the pivotal connection between the center piece and said stem extension including interengaging apertured ears on said stem extension and center piece and a pivot pin passing through the apertures in the ears, and said pivot pin being formed with a single, transverse, diametric opening interconnecting the through openings in said center piece and stem extension, and the pivotal connection between the center piece and the tip, including interengaging apertured ears, and a pivot pin passing through the apertures therein and formed with a single, transverse, diametric through opening communicating with the through openings in said center piece and tip, all of said openings being in tandem coaxial alignment providing a uniform continuously straight passageway when the pipe is in smoking position so that a pipe cleaner can be easily passed through said passageway for cleaning the same.

6. A smoking pipe comprising a bowl provided with a stem member, a second stem member, one of said stem members being formed with a pair of parallel spaced apertured ears, the other stem member being formed with a central apertured ear received between said pair of parallel apertured ears, and a pivot pin extending through said apertured ears for pivotally connecting said stem members, said stem members being formed with through openings, the through opening in said other stem member extending to the outer end of said central ear, said pivot pin being formed with a diametric through opening registering with the through opening in the said other stem member, and said pin being attached thereto, all of said openings being in tandem coaxial alignment providing a uniform continuously straight passageway when the pipe is in smoking position so that a pipe cleaner can be easily passed through said passageway for cleaning the same.

7. A smoking pipe comprising a bowl provided with a stem member, a second stem member, one of said stem members being formed with a pair of parallel spaced apertured ears, the other stem member being formed with a central apertured ear received between said pair of parallel apertured ears, a pivot pin extending through said apertured ears for pivotally connecting said stem members, said stem members being formed with through openings, the through opening in said other stem member extending to the outer end of said central ear, said pivot pin being formed with a diametric through opening registering with the through opening in the said other stem member, and said pin being attached thereto, a tip, one of said stem members and said tip being formed with interengaging apertured ears, said tip being formed with a through opening, and a pivot pin extending through the apertured ears and said tip, and said one of said stem members, and being formed with a diametric opening interconnecting the through openings in said tip and said one of said stem members, all of said openings being in tandem coaxial alignment providing a uniform continuously straight passageway when the pipe is in smoking position so that a pipe cleaner can be easily passed through said passageway for cleaning the same.

8. A smoking pipe comprising a bowl formed with a stem extension, a center piece pivoted to the stem extension, a tip pivoted to the center piece, said center piece being swingable upwardly relative to said stem extension to a position parallel to the bowl, and said tip being swingable to a position at right angles to the center piece and overlying the bowl, the pivotal connection between the center piece and the stem extension including means to prevent rotation of the center piece below horizontal position when said stem extension is in horizontal position, and the pivotal connection between the tip and the center piece including means to prevent rotation of the tip below horizontal position when said center piece is in horizontal position, said stem extension, center piece and tip being formed with through opening, the pivotal connection between said center piece and said stem extension, including interengaging apertured ears on said center piece and said stem extension, and a pivot pin pivotally interconnecting the same, and formed with only a single, straight through opening which extends completely across the pin and communicates with the through openings in said center piece and said stem extension, and the pivotal connection between the tip and the said center piece, including apertured ears thereon, and a pivot pin interconnecting the same, and formed with only a single, straight through opening which extends completely across the pin and communicates with the through openings in said center piece and tip, all of said openings being in tandem coaxial alignment providing a uniform continuously straight passageway when the pipe is in smoking position so that a pipe cleaner can be easily passed through said passageway for cleaning the same.

9. A smoking pipe comprising a bowl formed with a stem extension part, a stem member part, said stem extension part being formed with through opening communicating with the interior of said bowl, said stem extension part being formed with a longitudinal through opening, said stem extension and stem member part being provided with interengaging apertured ears, a pin passing through the apertures in said ears for pivotally connecting the stem member part to the stem extension part, said pin being formed with transverse, straight, diametric opening establishing communication between the through opening in the stem extension part and the through opening in the stem member part, said pivot pin being attached to one of said parts so that when one part is moved at right angles to the other part, the through opening in the part to which the pin is attached is open at the pivotal connection, all of said through openings being similar in cross section and in tandem coaxial alignment providing a uniform continuously straight passageway when the pipe is in smoking position so that a pipe cleaner can be easily passed through said passageway for cleaning the same.

10. In a smoking pipe having a bowl stem extension and formed with a through duct, a center piece formed with a through duct, means to swingably interconnect the center piece to the stem extension including a cock pin, said cock pin being provided with only a single straight duct which extends completely across the cock pin and communicates with the ducts in said stem extension and said center piece, the ducts in said stem extension, cock pin and center piece being of similar cross section and in alignment and providing a continuously straight uniform passageway when in smoking position.

11. In a smoking pipe having a bowl stem extension and formed with a through duct, a center piece formed with a through duct, means to swingably interconnect the center piece to the stem extension including a cock pin, said cock pin being provided with only a single straight duct which extends completely across the cock pin and communicates with the ducts in said stem extension and said center piece, and a tip formed with a through duct and swingably connected to the center piece by a cock pin provided with only a single straight duct which extends completely across said cock pin and communicates with the ducts in said center piece and tip, the ducts in said stem extension, center piece, tip and cock pins being of similar cross section and providing a continuously straight uniform passageway when in smoking position.

12. In a smoking pipe having a bendable stem and a bowl and tip connected through said stem when in alignment for smoking a plurality of joints including a cock pin in each joint and formed with a single straight diametric duct and positioned to bring a part of said stem alongside said bowl and another part along over the open end of said bowl when said stem is bent, said stem, said joints and said tip each being formed with a straight aligned coaxial duct at its axis communicating with the ducts in the cock pins, tip and bowl and all of said ducts being of similar cross section, whereby a pipe stem cleaner may be passed through said ducts to clean the stem, tip and bowl.

JOSEPH A. SMITH.

REFERENCES CITED

The following references are of record in the file of this patent:

UNITED STATES PATENTS

| Number | Name | Date |
| --- | --- | --- |
| 520,599 | Jonasson | May 29, 1894 |
| 777,306 | Rawlinson | Dec. 13, 1904 |
| 1,493,236 | Birchall | May 6, 1924 |
| 2,100,069 | Creveling | Nov. 23, 1937 |
| 2,333,802 | Lowrey | Nov. 9, 1943 |
| 2,475,472 | Brown | July 5, 1949 |